(12) United States Patent
Jiang et al.

(10) Patent No.: US 9,399,692 B1
(45) Date of Patent: Jul. 26, 2016

(54) AMPHIPHILIC RESERVOIR PROTECTING AGENT AND PREPARATION METHOD THEREOF AND DRILLING FLUID

(71) Applicant: China University of Petroleum (Beijing), Beijing—Changping District (CN)

(72) Inventors: Guancheng Jiang, Beijing (CN); Yang Xuan, Beijing (CN); Xi Wang, Beijing (CN); Ranran Song, Beijing (CN); Xianzhu Wu, Beijing (CN); Junbin Chen, Beijing (CN); Wei Ou Yang, Beijing (CN); Taotao Luo, Beijing (CN); Lan Wang, Beijing (CN)

(73) Assignee: China University of Petroleum (Beijing) (CN)

( * ) Notice: Subject to any disclaimer, the term of this patent is extended or adjusted under 35 U.S.C. 154(b) by 0 days.

(21) Appl. No.: 14/860,295

(22) Filed: Sep. 21, 2015

(30) Foreign Application Priority Data

Feb. 6, 2015 (CN) .......................... 2015 1 0064715

(51) Int. Cl.
*C08F 222/38* (2006.01)
*C09K 8/035* (2006.01)

(52) U.S. Cl.
CPC ............. *C08F 222/385* (2013.01); *C09K 8/035* (2013.01)

(58) Field of Classification Search
None
See application file for complete search history.

(56) References Cited

U.S. PATENT DOCUMENTS 7,678,743 B2    3/2010   Munoz, Jr. et al.

FOREIGN PATENT DOCUMENTS

| CN | 101220261 A | 7/2008 |
| CN | 101824103 A | 9/2010 |
| CN | 103184035 A | 7/2013 |
| WO | WO 2014/036498 A2 * | 3/2014 |

OTHER PUBLICATIONS

First Office Action from Chinese Patent Application No. 201510064715.8 dated Aug. 5, 2015.

Notification of Grant of Paten Right for Invention for Chinese Patent Application No. 201510064715.8, including allowed claims, dated Dec. 7, 2015.

* cited by examiner

*Primary Examiner* — Jeffrey Washville
(74) *Attorney, Agent, or Firm* — Calfee, Halter & Griswold LLP

(57) ABSTRACT

The present subject matter relates to an amphiphilic reservoir protecting agent, including structural units denoted by the following formula (1), (2), (3) and (4). The present subject matter further provides a method for preparation of an amphiphilic reservoir protecting agent. The present subject matter further provides a drilling fluid that contains the amphiphilic reservoir protecting agent. The amphiphilic reservoir protecting agent and drilling fluid obtained in the present subject matter have high reservoir protection property and high shale inhibition property.

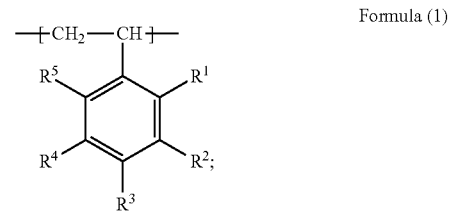

Formula (1)

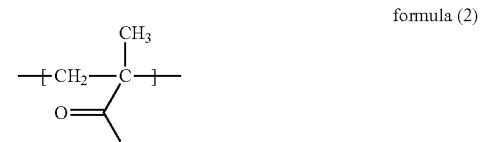

formula (2)

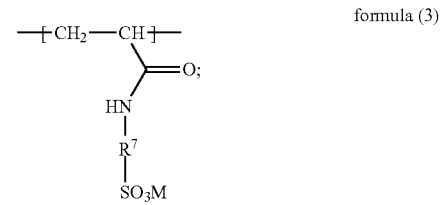

formula (3)

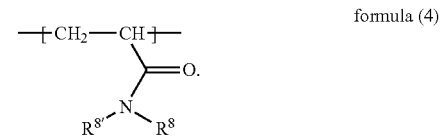

formula (4)

11 Claims, No Drawings

AMPHIPHILIC RESERVOIR PROTECTING AGENT AND PREPARATION METHOD THEREOF AND DRILLING FLUID

CROSS REFERENCE TO RELATED APPLICATIONS

This application claims priority to Chinese Patent Application No. 201510064715.8 filed on Feb. 6, 2015 and entitled "AMPHIPHILIC RESERVOIR PROTECTING AGENT, PREPARATION METHOD AND USE THEREOF, AND DRILLING FLUID AND USE THEREOF", the entire content of which is fully incorporated here by reference.

FIELD OF THE INVENTION

The present subject matter relates to an amphiphilic reservoir protecting agent, a method for preparation of the amphiphilic reservoir protecting agent, a drilling fluid containing the amphiphilic reservoir protecting agent.

BACKGROUND OF THE INVENTION

In every link in oil and gas exploration, development, and recovery, damages to the oil and gas reservoir may occur, and any slight contaminative damage may result in severely reduced production yield. Therefore, the problem of reservoir contamination has been recognized gradually, and reservoir protection techniques have been developed rapidly accordingly. Various simplex and complex reservoir protective materials have taken active roles in the application in well drilling. However, existing protecting agents still have some drawbacks, for example: 1) cationic emulsified asphalt products have severe impacts on the properties of drilling fluids, and have high deformability, poor elasticity and rigidity, poor plugging performance, and low pressure bearing capacity; 2) polymeric alcohol products have poor plugging performance, and some products tend to produce foams; 3) though non-permeability or extra-low-permeability reservoir protecting agents have good plugging performance, they have high viscosity and poor inhibition property; 4) super-fine calcium carbonate products are reservoir protecting agents that have little elasticity and poor deformability, and thereby have poor adaptability to the strata, low plugging performance, and little rock inhibition property; polymeric products have poor temperature and salt tolerance, and thereby have poor reservoir protection performance in high-temperature and high-salinity environments.

SUMMARY OF THE INVENTION

The present application discloses an amphiphilic reservoir protecting agent and preparation method thereof and drilling fluid.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

In view of the above drawbacks in the existing reservoir protecting agents in the prior art, the present subject matter provides an amphiphilic reservoir protecting agent that has high reservoir protection performance and high shale inhibition property, and its preparation method, and a drilling fluid containing the amphiphilic reservoir protecting agent, and use of the drilling fluid.

To attain the objects described above, the present subject matter provides an amphiphilic reservoir protecting agent, comprising structural units denoted by the following formula (1), (2), (3) and (4):

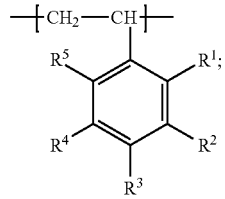

formula (1)

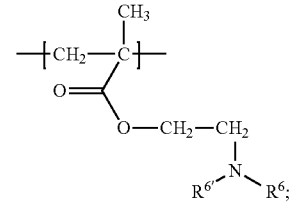

formula (2)

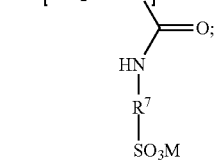

formula (3)

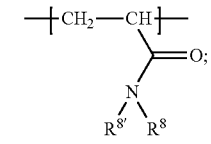

formula (4)

wherein $R^1$, $R^2$, $R^3$, $R^4$, and $R^5$ independently are H, $C_1$-$C_4$ alkyl or $C_1$-$C_4$ alkoxyl; $R^6$ and $R^{6'}$ independently are $C_1$-$C_3$ alkyl; $R^7$ is substituted or unsubstituted $C_1$-$C_6$ alkyl; M is H or an alkali metal element; $R^8$ and $R^{8'}$ independently are $C_1$-$C_6$ alkyl, hydroxy-substituted $C_1$-$C_6$ alkyl, phenyl or $C_1$-$C_6$ alkyl substituted phenyl; the molar ratio of the structural units denoted by formula (1):the structural units denoted by formula (2):the structural units denoted by formula (3):the structural units denoted by formula (4) is 1:0.4-2:0.5-1:0.1-0.5; wherein the weight-average molecular weight of the amphiphilic reservoir protecting agent is 150,000-350,000 g/mol.

The present subject matter further provides a method for preparation of an amphiphilic reservoir protecting agent, comprising: mixing a chemical compound represented by formula (5), a chemical compound represented by formula (6), a chemical compound represented by formula (7), a chemical compound represented by formula (8), and an initiator in water to obtain an emulsified mixture, and initiating a polymerization reaction therein; wherein a molar ratio of the chemical compound represented by formula (5):the chemical compound represented by formula (6):the chemical compound represented by formula (7):the chemical compound represented by formula (8) is 1:0.4-2.5:0.5-1.5:0.1-0.8; conditions of the polymerization reaction ensures that weight-average molecular weight of the obtained polymer is 150,000-350,000 g/mol;

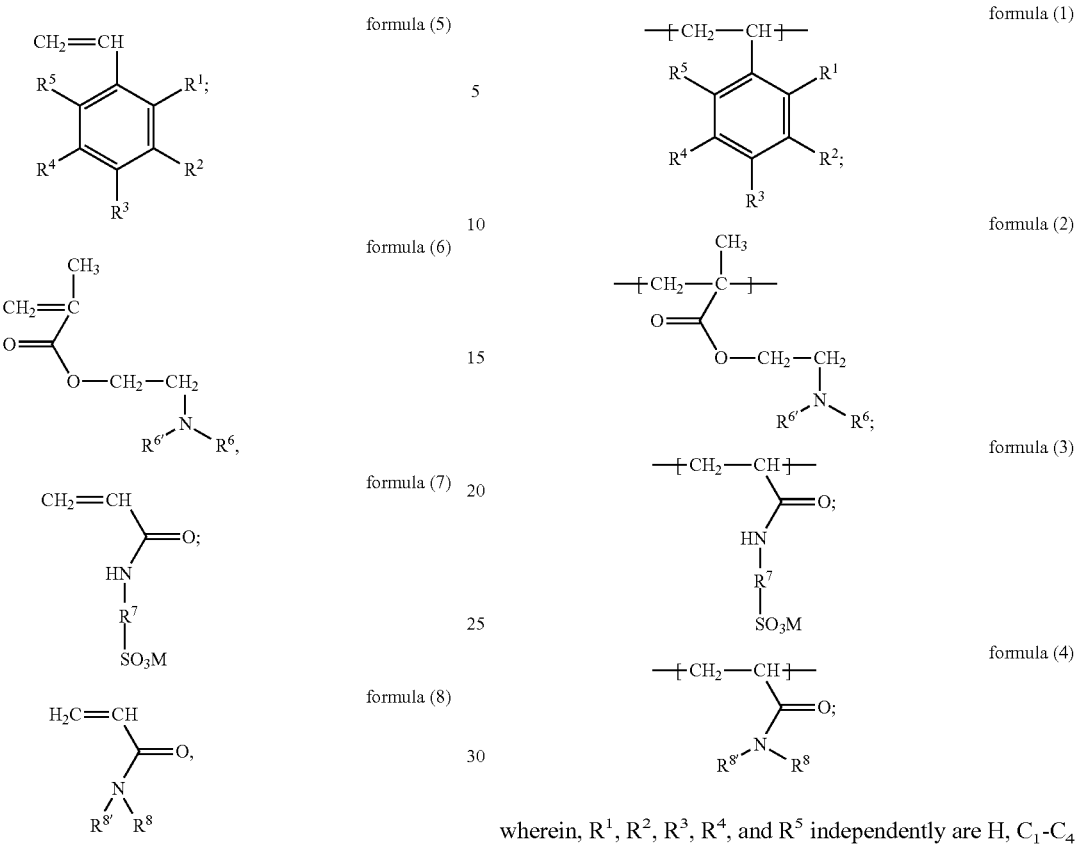

wherein $R^1$, $R^2$, $R^3$, $R^4$, and $R^5$ independently are H, $C_1$-$C_4$ alkyl or $C_1$-$C_4$ alkoxyl; $R^6$ and $R^{6'}$ independently are $C_1$-$C_3$ alkyl; $R^7$ is substituted or unsubstituted $C_1$-$C_6$ alkyl; M is H or an alkali metal element; $R^8$ and $R^{8'}$ independently are $C_1$-$C_6$ alkyl, hydroxy-substituted $C_1$-$C_6$ alkyl, phenyl or $C_1$-$C_6$ alkyl substituted phenyl.

The present subject matter further provides a drilling fluid, which contains the amphiphilic reservoir protecting agent disclosed in the present subject matter.

The amphiphilic reservoir protecting agent provided in the present subject matter is an amphiphilic polymer (hereinafter the "amphiphilic reservoir protecting agent" is also referred to as an "amphiphilic polymer" in some cases), which comprises a type of hydrophilic structural units and three types of hydrophobic structural units, and has high reservoir plugging performance as well as good shale inhibition effect; it can protect the reservoir against damages resulted from intrusion of the drilling fluid and maintain the stability of well wall covered by clay shale. Especially, the method for preparation of the amphiphilic reservoir protecting agent in the present subject matter is a soap-free emulsion polymerization method, with which the preparation cost of the amphiphilic reservoir protecting agent can be decreased, the production process of the amphiphilic reservoir protecting agent can be simplified, and the obtained product is purer.

Other aspects and advantages of the present subject matter will be further detailed in the embodiments hereunder.

The present subject matter provides an amphiphilic reservoir protecting agent, comprising structural units denoted by the following formula (1), (2), (3) and (4):

wherein, $R^1$, $R^2$, $R^3$, $R^4$, and $R^5$ independently are H, $C_1$-$C_4$ alkyl or $C_1$-$C_4$ alkoxyl; $R^6$ and $R^{6'}$ independently are $C_1$-$C_3$ alkyl; $R^7$ is substituted or unsubstituted $C_1$-$C_6$ alkyl; M is H or an alkali metal element; $R^8$ and $R^{8'}$ independently are $C_1$-$C_6$ alkyl, hydroxy-substituted $C_1$-$C_6$ alkyl, phenyl or $C_1$-$C_6$ alkyl substituted phenyl; the molar ratio of the structural units denoted by formula (1):the structural units denoted by formula (2):the structural units denoted by formula (3):the structural units denoted by formula (4) is 1:0.4-2:0.5-1:0.1-0.5; wherein, the weight-average molecular weight of the amphiphilic reservoir protecting agent is 150,000-350,000 g/mol.

According to the present subject matter, the amphiphilic polymer contains hydrophilic sulfonate groups as well as a large quantity of hydrophobic groups including benzene rings, N,N-dialkyl substituted amides, and esters. When the amphiphilic polymer is used as a reservoir protecting agent in a drilling fluid, the strongly hydrophilic sulfonate groups in the drilling fluid will attach to the surface of the clay, so that the hydrated film on the surface of the clay is thickened, and thereby the diffused electric doublet layer on the surface of the clay is enhanced, and flocculation or agglomeration of the clay incurred by high temperature and high-salinity electrolytes can be effectively prevented. Hence, the amphiphilic polymer can endow the drilling fluid with outstanding temperature tolerance, salinity tolerance, and filtrate loss reduction properties, and can effectively prevent the drilling fluid from permeating into the reservoir in high-temperature and high-salinity environments. In addition, the hydrophilic sulfonate groups can attach to the surface of reservoir rock and overlying clay shale, while the hydrophobic groups extend outward from the rock surface; thus, a hydrophobic film can be formed on the rock surface. The hydrophobicity can inhibit the permeation of free water in the drilling fluid into the reservoir rock and clay shale. Thus, on one hand, the reservoir is protected against water-sensitivity damage from the drilling fluid; on the other hand, the hydrated expansion and dispersion of the clay shale can be inhibited.

According to the present subject matter, to obtain an amphiphilic polymer serving as a drilling fluid protecting agent with higher performance, preferably, in the structural units denoted by formula (1), (2), (3) and (4), which constitute the protecting agent, $R^1$, $R^2$, $R^3$, $R^4$, and $R^5$ independently are H, $C_1$-$C_3$ alkyl or $C_1$-$C_3$ alkoxyl. More preferably, $R^1$, $R^2$, $R^3$, $R^4$, and $R^5$ independently are H, methyl, ethyl, methoxyl or ethyoxyl; further more preferably, $R^1$, $R^2$, $R^3$, $R^4$, and $R^5$ independently are H, methyl, ethyl, or methoxyl.

According to the present subject matter, preferably, $R^6$ and $R^{6'}$ independently are methyl, ethyl or n-propyl, more preferably are methyl or ethyl.

According to the present subject matter, preferably, $R^7$ is substituted or unsubstituted $C_2$-$C_6$ alkyl, more preferably is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$, —$CH_2$—$CH_2$—, —$CHCH_3$—$CH_2$— or —$CH_2$—$CHCH_3$—$CH_2$—, further more preferably is —$C(CH_3)_2$—$CH_2$—, —$CH_2$—$C(CH_3)_2$—, —$CH_2$—$CH_2$—, —$CHCH_3$—$CH_2$— or —$CH_2$—$CHCH_3$—$CH_2$—, even further more preferably is —$C(CH_3)_2$—$CH_2$—.

According to the present subject matter, M preferably is H, Na, K or Li, more preferably is H or Na.

According to the present subject matter, preferably, $R^8$ and $R^{8'}$ independently are methyl, ethyl, n-propyl, n-butyl, isobutyl, n-hexyl, phenyl, p-methylphenyl, p-ethylphenyl, methylol or ethoxyl.

In an embodiment of the present subject matter, in the structural units denoted by formula (1), (2), (3), and (4), which constitute the amphiphilic reservoir protecting agent, $R^1$, $R^2$, $R^3$, $R^4$ and $R^5$ are H, $R^6$ and $R^{6'}$ are methyl, $R^7$ is —$C(CH_3)_2$—$CH_2$—, and $R^8$ and $R^{8'}$ are ethyl.

In another embodiment of the present subject matter, in the structural units denoted by formula (1), (2), (3), and (4), which constitute the amphiphilic reservoir protecting agent, $R^1$, $R^2$, $R^4$ and $R^5$ are H, $R^3$ is methoxyl, $R^6$ and $R^{6'}$ are ethyl, $R^7$ is —$C(CH_3)_2$—$CH_2$—, and $R^8$ and $R^{8'}$ are methyl.

In another embodiment of the present subject matter, in the structural units denoted by formula (1), (2), (3), and (4), which constitute the amphiphilic reservoir protecting agent, $R^1$, $R^2$, $R^3$, $R^4$ and $R^5$ are H, $R^6$ and $R^{6'}$ are ethyl, $R^7$ is —$C(CH_3)_2$—$CH_2$—, and $R^8$ and $R^{8'}$ are hexyl.

There is no particular restriction on the terminal groups of the polymer constituted by the structural units denoted by formula (1), (2), (3), and (4). In other words, the terminal groups can be ordinary groups, such as H, hydroxy, or salts, etc.

Though the amphiphilic reservoir protecting agent can be added as a protecting agent into a drilling fluid as long as the weight-average molecular weight of the amphiphilic reservoir protecting agent is within the range of 150,000-350,000 g/mol, the film forming effect will be poor if the molecular weight is too low, and the viscosity of the drilling fluid will be too high if the molecular weight is too high. Preferably, the weight-average molecular weight of the amphiphilic reservoir protecting agent is 190,000-280,000 g/mol.

Preferably, the molecular weight distribution coefficient (Mw/Mn) of the amphiphilic reservoir protecting agent is 1-3.5, more preferably is 2-3.

According to the present subject matter, to balance the effect of the hydrophobic end and the effect of the hydrophilic end in the amphiphilic reservoir protecting agent to obtain an amphiphilic reservoir protecting agent with superior reservoir protection performance, the content amounts of the four types of structural units that constitute the amphiphilic reservoir protecting agent should be controlled at an appropriate ratio, i.e., the molar ratio of the structural units denoted by formula (1):the structural units denoted by formula (2):the structural units denoted by formula (3), and the structural units denoted by formula (4) is 1:0.5-2:0.5-1:0.1-0.5. To further improve the performance of the amphiphilic polymer, preferably, the molar ratio of the structural units denoted by formula (1), the structural units denoted by formula (2), the structural units denoted by formula (3), and the structural units denoted by formula (4) is 1:0.5-1.5:0.5-1:0.1-0.4, more preferably is 1:1-1.5:0.6-0.8:0.2-0.4.

The present subject matter further provides a preparation method of an amphiphilic polymer, comprising: mixing a chemical compound represented by formula (5), a chemical compound represented by formula (6), a chemical compound represented by formula (7), and a chemical compound represented by formula (8) and an initiator in water to obtain an emulsified mixture, and initiating a polymerization reaction therein; wherein, a molar ratio of the chemical compound represented by formula (5):the chemical compound represented by formula (6):the chemical compound represented by formula (7):the chemical compound represented by formula (8) is 1:0.4-2.5:0.5-1.5:0.1-0.8; conditions of the polymerization reaction ensures that weight-average molecular weight of the obtained polymer is 150,000-350,000 g/mol;

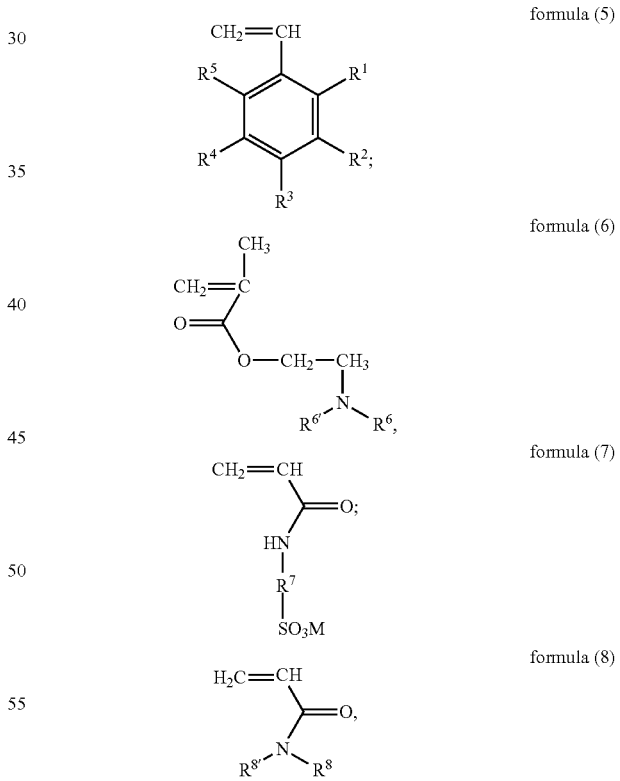

wherein, $R^1$, $R^2$, $R^3$, $R^4$, and $R^5$ independently are H, $C_1$-$C_4$ alkyl or $C_1$-$C_4$ alkoxyl; $R^6$ and $R^{6'}$ independently are $C_1$-$C_3$ alkyl; $R^7$ is substituted or unsubstituted $C_1$-$C_6$ alkyl; M is H or an alkali metal element; $R^8$ and $R^{8'}$ independently are $C_1$-$C_6$ alkyl, hydroxy-substituted $C_1$-$C_6$ alkyl, phenyl or $C_1$-$C_6$ alkyl substituted phenyl.

Wherein, the structural units of the amphiphilic reservoir protecting agent depend on the chemical compound represented by formula (5), the chemical compound represented by formula (6), the chemical compound represented by formula (7), and the chemical compound represented by formula (8), which can be selected according to the desired structure of the amphiphilic reservoir protecting agent. Thus, the $R^1$, $R^2$, $R^3$, $R^4$, $R^5$, $R^6$, $R^{6'}$, $R^7$, M, $R^8$ and $R^{8'}$ are preferably within the scopes described above.

In an embodiment, the chemical compound represented by formula (5) is one or more of styrene, 4-methyl styrene, and 4-methoxystyrene.

In another embodiment, the chemical compound represented by formula (6) is one or more of N,N-dimethylamino ethyl methacrylate, N,N-diethylamino ethyl methacrylate, N,N-dipropylamino ethyl methacrylate, N,N-dibutylamino ethyl methacrylate, and N,N-diamylamino ethyl methacrylate, more preferably is N,N-dimethylamino ethyl methacrylate and/or N,N-diethylamino ethyl methacrylate.

In another embodiment, the chemical compound represented by formula (7) is one or more of 2-acrylamide-2-methyl propanesulfonic acid, 2-acrylamide propanesulfonic acid, and 2-acrylamide-1-methyl propanesulfonic acid, more preferably is 2-acrylamide-2-methyl propanesulfonic acid.

In another embodiment, the chemical compound represented by formula (8) is one or more of N,N-dimethylacrylamide, N,N-diethylacrylamide, N,N-dipropylacrylamide, and N,N-dihexylacrylamide.

In another embodiment, the molar ratio of the chemical compound represented by formula (5):the chemical compound represented by formula (6):the chemical compound represented by formula (7), and the chemical compound represented by formula (8) is 1:0.5-2:0.5-1:0.1-0.5.

The polymerization reaction among the chemical compound represented by formula (5), the chemical compound represented by formula (6), the chemical compound represented by formula (7), and the chemical compound represented by formula (8) is actually a soap-free emulsion polymerization reaction, in which both the chemical compound represented by formula (7) and the chemical compound represented by formula (8), which are monomers, take an emulsifying effect. Hence, no other emulsifier is required in the polymerization reaction in the present subject matter. Therefore, the method for preparation of the amphiphilic reservoir protecting agent disclosed in the present subject matter can be used to prepare an amphiphilic reservoir protecting agent with higher purity at a lower cost in a simpler way.

The concentration of the initiator can vary in a wide range, as long as the amphiphilic polymer disclosed in the present subject matter can be obtained. Preferably, based on the total weight of the emulsified mixture, the concentration of the initiator is 0.5-2 wt. %. More preferably, the initiator is one or more of azobis(isobutylamidine hydrochloride), 4,4'-azobis (4-cyanovaleric acid), azodiisobutyronitrile, potassium persulfate, ammonium persulfate, and hydrogen peroxide, further more preferably is one or more of azobis (isobutylamidine hydrochloride), 4,4'-azobis(4-cyanovaleric acid) and azodiisobutyronitrile.

In view of the high activity of the initiator, in the present subject matter, an inactive gas can be fed into the reaction system to expel oxygen in the reaction system and thereby keep the polymerization reaction in inert atmosphere before the polymerization reaction is started, wherein, the inactive gas is a gas that will not participate in the polymerization reaction and can expel oxygen, such as nitrogen, helium, or neon, etc. The inactive gas can be fed for 30-60 min, for example.

Likewise, to control the reaction rate of the polymerization reaction, preferably the emulsified mixture is heated up to 60-75° C. after the inactive gas is fed; then, the initiator can be added, and the polymerization reaction can be started.

According to the present subject matter, preferably, the conditions of the polymerization reaction include: temperature is 65-80° C., time is 5-10 h. Through a polymerization reaction under such conditions, a polymer with 150,000-350,000 g/mol weight-average molecular weight can be obtained, and an amphiphilic polymer that is especially suitable for use as a drilling fluid protecting agent can be obtained through polymerization.

The amphiphilic polymer disclosed in the present subject matter can be obtained after the polymerization reaction. To produce the amphiphilic reservoir protecting agent into a solid product, the amphiphilic polymer obtained after the polymerization reaction is completed can be cooled down to room temperature (20-40° C.), and then the aqueous dispersion can be evaporated with a rotary evaporator, and the obtained solid can be ground to powder state, so as to obtain an amphiphilic reservoir protecting agent product in yellowish powder form. Accordingly, the present subject matter provides an amphiphilic reservoir protecting agent prepared with the method described above.

The present subject matter further provides a drilling fluid, which contains the amphiphilic polymer described above. That is to say, the drilling fluid contains one or more amphiphilic polymers described above.

According to the present subject matter, preferably, based on the total weight of the drilling fluid, the content amount of the amphiphilic polymer is 1-3 wt. %.

The drilling fluid preferably is an aqueous drilling fluid. As an aqueous drilling fluid, the drilling fluid disclosed in the present subject matter can further contain ordinary additives for aqueous drilling fluids in the art. For example, the drilling fluid can one or more of contain 2-4 wt. % of bentonite (e.g., sodium bentonite or calcium bentonite), 0.1-0.5 wt. % of tackifier (e.g., partially hydrolyzed polyacrylamide or sodium carboxymethyl cellulose), 3-6 wt. % of filtrate reducer (e.g., sulfomethylated phenolic resin or sulfomethylated lignite resin), 0.1-0.3 wt. % of flow pattern regulator (e.g., xanthan gum), 2-4 wt. % of anti-collapse agent (e.g., sulfonated asphalt or potassium methyl silicate), 2-4 wt. % of lubricant (e.g., mixture of sulfonated oil sediment, diesel oil, and surface active agent), and 10-20 wt. % of barite (e.g., barite with 90 wt. % or more barium sulfate).

The present subject matter further provides a use of the amphiphilic polymer or drilling fluid in protection of oil and gas reservoirs.

When the amphiphilic polymer or drilling fluid disclosed in the present subject matter is used for protection of oil and gas reservoirs, it can not only protect the reservoir effectively in harsh environments (e.g., high-temperature and high-salinity environments), but also can maintain the stability of well wall covered by clay shale.

Hereunder the present subject matter will be further detailed in some embodiments.

Wherein, the weight-average molecular weight is measured with a gel permeation chromatograph (GPC); the molecular weight distribution coefficient is the ratio of the weight-average molecular weight measured with a GPC to number-average molecular weight.

Example 1

This example is provided to describe the amphiphilic reservoir protecting agent and the method for preparation of the amphiphilic reservoir protecting agent in the present subject matter.

Add styrene (15 g, 0.14 mol), N,N-dimethylamino ethyl methacrylate (11.3 g, 0.072 mol), 2-acrylamide-2-methyl propanesulfonic acid (14.9 g, 0.072 mol) and N,N-diethylacrylamide (3.66 g, 0.029 mol) into 100 mL water and stir into an emulsion, feed nitrogen into the emulsion for 30 min., heat up the emulsion to 70° C., and add 0.5 g of 4,4'-azobis (4-cyanovaleric acid), and then further heat up to 75° C. and hold at the temperature for 6 h; after the reaction is completed, cool down the reaction solution to room temperature (about 20° C.), evaporate the aqueous dispersion of the product with a rotary evaporator, and grind the obtained solid to powder state; thus, 43.45 g solid amphiphilic reservoir protecting agent (yellowish powder) is obtained, which is the amphiphilic reservoir protecting agent described in the present subject matter. The weight-average molecular weight is 213,200 g/mol, and the molecular weight distribution coefficient is 2.3. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:0.43:0.52:0.22 molar ratio.

Example 2

This example is provided to describe the amphiphilic reservoir protecting agent and the method for preparation of the amphiphilic reservoir protecting agent in the present subject matter.

Add 4-methoxystyrene (17 g, 0.13 mol), N,N-diethylamino ethyl methacrylate (24.1 g, 0.13 mol), 2-acrylamide-2-methyl propanesulfonic acid (26.94 g, 0.13 mol) and N,N-dimethylacrylamide (4.95 g, 0.05 mol) into 100 mL water and stir into an emulsion, feed nitrogen into the emulsion for 40 min., heat up the emulsion to 60° C., and add 0.3 g of azobis (isobutylamidine hydrochloride), and then further heat up to 70° C. and hold at the temperature for 8 h; after the reaction is completed, cool down the reaction solution to room temperature (20° C.), evaporate the aqueous dispersion of the product with a rotary evaporator, and grind the obtained solid to powder state; thus, 69.85 g solid amphiphilic reservoir protecting agent (yellowish powder) is obtained, which is the amphiphilic reservoir protecting agent described in the present subject matter. The weight-average molecular weight is 275,600 g/mol, and the molecular weight distribution coefficient is 2.9. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:1:1:0.38 molar ratio.

Example 3

This example is provided to describe the amphiphilic reservoir protecting agent and the method for preparation of the amphiphilic reservoir protecting agent in the present subject matter.

Add styrene (15 g, 0.14 mol), N,N-diethylamino ethyl methacrylate (25.9 g, 0.14 mol), 2-acrylamide-2-methyl propanesulfonic acid (29.85 g, 0.14 mol) and N,N-dihexylacrylamide (3.34 g, 0.014 mol) into 100 mL water and stir into an emulsion, feed nitrogen into the emulsion for 50 min., heat up the emulsion to 75° C., and add 0.3 g of azodiisobutyronitrile, and then further heat up to 80° C. and hold at the temperature for 5 h; after the reaction is completed, cool down the reaction solution to room temperature (20° C.), evaporate the aqueous dispersion of the product with a rotary evaporator, and grind the obtained solid to powder state; thus, 71.55 g solid amphiphilic reservoir protecting agent (yellowish powder) is obtained, which is the amphiphilic reservoir protecting agent described in the present subject matter. The weight-average molecular weight is 194,800 g/mol, and the molecular weight distribution coefficient is 2.5. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:1:1:0.1 molar ratio.

Example 4

This example is provided to describe the amphiphilic reservoir protecting agent and the method for preparation of the amphiphilic reservoir protecting agent in the present subject matter.

Add styrene (15 g, 0.14 mol), N,N-dimethylamino ethyl methacrylate (11.3 g, 0.072 mol), 2-acrylamide-2-methyl propanesulfonic acid (14.9 g, 0.072 mol) and N,N-diethylacrylamide (3.66 g, 0.029 mol) into 100 mL water and stir into an emulsion, feed nitrogen into the emulsion for 30 min., heat up the emulsion to 75° C., and add 0.6 g of 4,4'-azobis (4-cyanovaleric acid), and then further heat up to 80° C. and hold at the temperature for 4 h; after the reaction is completed, cool down the reaction solution to room temperature (20° C.), evaporate the aqueous dispersion of the product with a rotary evaporator, and grind the obtained solid to powder state; thus, 42.96 g solid amphiphilic reservoir protecting agent (yellowish powder) is obtained, which is the amphiphilic reservoir protecting agent described in the present subject matter. The weight-average molecular weight is 151,000 g/mol, and the molecular weight distribution coefficient is 2.7. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:0.52:0.54:0.19 molar ratio.

Example 5

This example is provided to describe the amphiphilic reservoir protecting agent and the method for preparation of the amphiphilic reservoir protecting agent in the present subject matter.

Add styrene (15 g, 0.14 mol), N,N-dimethylamino ethyl methacrylate (11.3 g, 0.072 mol), 2-acrylamide-2-methyl propanesulfonic acid (14.9 g, 0.072 mol) and N,N-diethylacrylamide (3.66 g, 0.029 mol) into 100 mL water and stir into an emulsion, feed nitrogen into the emulsion for 30 min., heat up the emulsion to 60° C., and add 0.3 g of 4,4'-azobis (4-cyanovaleric acid), and then further heat up to 65° C. and hold at the temperature for 6 h; after the reaction is completed, cool down the reaction solution to room temperature (20° C.), evaporate the aqueous dispersion of the product with a rotary evaporator, and grind the obtained solid to powder state; thus, 42.45 g solid amphiphilic reservoir protecting agent (yellowish powder) is obtained, which is the amphiphilic reservoir protecting agent described in the present subject matter. The weight-average molecular weight is 334,000 g/mol, and the molecular weight distribution coefficient is 3.1. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:0.48:0.55:0.22 molar ratio.

Comparative Example 1

Add styrene (5 g, 0.048 mol), N,N-dimethylamino ethyl methacrylate (22.6 g, 0.144 mol), 2-acrylamide-2-methyl propanesulfonic acid (19.9 g, 0.096 mol) and N,N-diethylacrylamide (6.06 g, 0.048 mol) into 150 mL water and stir into an emulsion, feed nitrogen into the emulsion for 30 min., heat up the emulsion to 75° C., and add 0.6 g of 4,4'-azobis (4-cyanovaleric acid), and then further heat up to 80° C. and hold at the temperature for 6 h; after the reaction is completed, cool down the reaction solution to room temperature (20° C.), evaporate the aqueous dispersion of the product with a rotary evaporator, and grind the obtained solid to powder state; thus, 42.18 g solid reservoir protecting agent (yellowish powder) is obtained. The weight-average molecular weight is 95,430 g/mol, and the molecular weight distribution coefficient is 1.9. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:3.25:2.91:0.87 molar ratio.

Comparative Example 2

Add styrene (10 g, 0.096 mol), N,N-dimethylamino ethyl methacrylate (2.98 g, 0.019 mol), 2-acrylamide-2-methyl propanesulfonic acid (29.8 g, 0.144 mol) and N,N-diethylacrylamide (9.84 g, 0.077 mol) into 80 mL water and stir into an emulsion, feed nitrogen into the emulsion for 30 min., heat up the emulsion to 55° C., and add 0.3 g of 4,4'-azobis(4-cyanovaleric acid), and then further heat up to 80° C. and hold at the temperature for 10 h; after the reaction is completed, cool down the reaction solution to room temperature (20° C.), evaporate the aqueous dispersion of the product with a rotary evaporator, and grind the obtained solid to powder state; thus, 43.89 g solid reservoir protecting agent (yellowish powder) is obtained. The weight-average molecular weight is 452,000 g/mol, and the molecular weight distribution coefficient is 3.5. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:0.23:1.52:0.81 molar ratio.

Comparative Example 3

Add styrene (10 g, 0.093 mol), N,N-dimethylamino ethyl methacrylate (43.8 g, 0.279 mol), 2-acrylamide-2-methyl propanesulfonic acid (38.49 g, 0.186 mol) and N,N-diethylacrylamide (11.73 g, 0.093 mol) into 130 mL water and stir into an emulsion, feed nitrogen into the emulsion for 30 min., heat up the emulsion to 70° C., and add 0.5 g of 4,4'-azobis (4-cyanovaleric acid), and then further heat up to 75° C. and hold at the temperature for 6 h; after the reaction is completed, cool down the reaction solution to room temperature (20° C.), evaporate the aqueous dispersion of the product with a rotary evaporator, and grind the obtained solid to powder state; thus, 98.47 g solid reservoir protecting agent (yellowish powder) is obtained. The weight-average molecular weight is 197,800 g/mol, and the molecular weight distribution coefficient is 1.9. Analyzed by H-NMR spectroscopy and C-NMR spectroscopy, the polymer contains structural units denoted by formula (1), structural units denoted by formula (2), structural units denoted by formula (3), and structural units denoted by formula (4) at 1:2.84:2.32:0.85 molar ratio.

Test Example 1

Add 3 parts by weight of anhydrous sodium carbonate and 40 parts by weight of bentonite (sodium bentonite from Weifang Huawei Bentonite Co., Ltd., China) sequentially into 1000 parts by weight of water while stirring, and then continue stirring for 8 h and hold still for 16 h in seal state, so as to obtain a base mud. Add 3 parts by weight of amphiphilic reservoir protecting agent prepared in the examples 1-5 and comparative examples 1-3 into 100 parts by weight of the base mud respectively, and stir at 8000 r/min speed for 20 min. Add 15 wt. % of sodium chloride into the 8 samples of base muds into which the amphiphilic polymer is added and a blank base mud respectively, and continue stirring for 20 min. Measure the filter loss under medium pressure (API.FL) and the filter loss under high temperature and high pressure (HTHP.FL) in the blank base mud and the base muds into which the polymer is added respectively, through the drilling fluid test procedure defined in SY/T5621-93. The API.FL and HTHP.FL test results are shown in Table 1.

TABLE 1

| Base mud | API.FL/mL | HTHP.FL/mL |
|---|---|---|
| Blank | 62.0 | Complete loss |
| Example 1 | 9.6 | 25.6 |
| Example 2 | 8.8 | 25.4 |
| Example 3 | 7.6 | 22.4 |
| Example 4 | 12.6 | 33.8 |
| Example 5 | 9.6 | 28.8 |
| Comparative example 1 | 17.4 | 44.6 |
| Comparative example 2 | 19.6 | 53.2 |
| Comparative example 3 | 25.4 | 61.4 |

Test Example 2

Take tap water, 10 wt. % KCl aqueous solution, 2 wt. % potassium formate aqueous solution, and 2 wt. % aqueous solutions of amphiphilic reservoir protecting agent prepared in the examples 1-5 and comparative examples 1-3 respectively as test solutions for shale dispersion and recovery test, and carry out shale dispersion and recovery test with these test solutions to evaluate the shale inhibition capability of the hydrophilic polymer disclosed in the present subject matter. The shale dispersion and recovery test mainly consists of the following steps: add 350 mL test solution into an aging can, weigh 50 g clay shale cuttings, and roll and disperse the clay shale cuttings for 16 h in a roller furnace at 77° C.; then, sieve the recovered rock specimen through a 40 mesh sieve in water to clean the rock specimen, load the residual rock specimen into a watch glass, and bake it for 6 h in an oven at 105° C.; next, take out the watch glass and dry it in air naturally at room temperature for 2 h, weigh the dry rock specimen, and calculate hot rolling recovery rate with the following expression:

$$S = M/50 \times 100$$

wherein: S—recovery rate after sieving through a 40 mesh sieve, %; M—sieve residue after sieving through a 40 mesh sieve, g.

TABLE 2

| Test Solution | Hot Rolling Recovery Rate/% |
|---|---|
| Tap water | 30.5 |
| KCl aqueous solution | 51.5 |
| Potassium formate aqueous solution | 57.6 |
| Aqueous solution of amphiphilic reservoir protecting agent in example 1 | 91.5 |
| Aqueous solution of amphiphilic reservoir protecting agent in example 2 | 93.5 |

TABLE 2-continued

| Test Solution | Hot Rolling Recovery Rate/% |
|---|---|
| Aqueous solution of amphiphilic reservoir protecting agent in example 3 | 94.6 |
| Aqueous solution of amphiphilic reservoir protecting agent in example 4 | 89.2 |
| Aqueous solution of amphiphilic reservoir protecting agent in example 5 | 90.3 |
| Aqueous solution of reservoir protecting agent in comparative example 1 | 76.3 |
| Aqueous solution of reservoir protecting agent in comparative example 2 | 74.4 |
| Aqueous solution of reservoir protecting agent in comparative example 3 | 72.9 |

Test Example 3

Prepare drilling fluids containing the polymers in the examples 1-5 and comparative examples 1-3 with the following formulation respectively: 3 wt. % of sodium bentonite (from Shandong Weifang Huawei Bentonite Co., Ltd., China), 0.2 wt. % of NaOH, 0.5 wt. % of KPAM (HL/K-PAM from Jiangxi Pingxiang Wulian Chemical Plant, China, the same below), 4 wt. % of KHM (from Jiangxi Pingxiang Boxin Industry Co., Ltd., China, the same below), 4 wt. % of SMP-II (from Jiangxi Pingxiang Hengchang Chemicals and New Materials Co., Ltd., the same below), 3 wt. % of amphiphilic reservoir protecting agent (the polymers in the examples 1-5 and comparative examples 1-3 respectively), 3 wt. % of potassium chloride, 3 wt. % of calcium carbonate, and 10 wt. % of barite (with 93 wt. % of barium sulfate, from Shandong Lingshou Xingwang Mineral Materials Processing Plant, China, the same below). A rock core damage test is a commonly used method for assessment of the reservoir protection performance of finishing agents, and it mainly consists of the following steps: a. carry out vacuum pumping for a rock core (the properties of the rock core are shown in Table 3), and immerse the rock core in 6 wt. % of standard brine for 24 h or longer time; b. measure the oleic permeability $K_1$ of the rock core in normal direction with JHMD-1 HTHP dynamic filter loss tester; c. carry out reverse displacement with the drilling fluids at 0.1 ml/min at 2-3PV respectively, and hold for 12 h; d. measure the oleic permeability $K_2$ in normal direction with decolored kerosene, and calculate the recovery rate of core permeability with the following expression: $S=K_2/K_1 \times 100\%$. The results are shown in Table 4.

TABLE 3

| Drilling Fluid | Length/ cm | Diameter/ cm | Porosity | Gas Log Permeability/ mD |
|---|---|---|---|---|
| Example 1 | 6.55 | 2.51 | 40.29 | 71.52 |
| Example 2 | 6.60 | 2.51 | 41.41 | 72.84 |
| Example 3 | 6.40 | 2.51 | 43.20 | 75.90 |
| Example 4 | 6.42 | 2.51 | 39.80 | 67.44 |
| Example 5 | 6.45 | 2.51 | 40.69 | 72.37 |
| Comparative example 1 | The same as example 1 | | | |
| Comparative example 2 | The same as example 1 | | | |
| Comparative example 3 | The same as example 1 | | | |

TABLE 4

| Drilling Fluid | Recovery Rate of Permeability/% |
|---|---|
| Example 1 | 93.23 |
| Example 2 | 91.6 |
| Example 3 | 92.15 |
| Example 4 | 89.4 |
| Example 5 | 87.55 |
| Comparative example 1 | 78.6 |
| Comparative example 2 | 81.56 |
| Comparative example 3 | 78.1 |

It can be seen in Table 1: in base muds into which the products in the examples 1-5 are added, the API filter loss is within 7-13 mL range, and the HTHP filter loss at 150° C. is within 22-34 mL range. In the base muds into which the products in the comparative examples 1-2 are added, the API filter loss is within 17-20 mL range, and the HTHP filter loss at 150° C. is within 44-54 mL range, which is apparently higher than the data obtained in the cases of the products in the examples.

It can be seen in Table 2: the hot rolling recovery rates of clay shale cuttings in the aqueous solutions of the products in the examples 1-5 are within 89-95% range, while the recovery rates of clay shale cuttings in the aqueous solutions of the products in the comparative examples 1-3 are within 74-77% range, which are apparently lower than the data obtained in the cases of the products in the examples.

It can be seen in Table 3 and Table 4: the recovery rates of permeability of sandstone core in the drilling fluids containing the products in the examples 1-5 are within 87-94% range, while the recovery rates of permeability in the drilling fluids containing the products in the comparative examples 1-3 are within 78-82% range, which are apparently lower than the data obtained in the cases of the products in the examples.

It can be seen through above analysis: polymers consisting of structural units denoted by formula (1), (2), (3) and (4) with weight-average molecular weight out of the range disclosed in the present subject matter are not ideal reservoir protecting agents too. Compared with the protecting agents in the examples 4-5, the protecting agents in the examples 1-3 have better filtrate reduction property, better temperature tolerance property, and better permeability recovery property, which further proves protecting agents with weight-average molecular weight within the preferred 190,000-280,000 g/mol range disclosed in the present subject matter have superior reservoir protection performance.

While some preferred embodiments of the present subject matter are described above, the present subject matter is not limited to the details in those embodiments. Those skilled in the art can make modifications and variations to the technical scheme of the present subject matter, without departing from the spirit of the present subject matter. However, all these modifications and variations shall be deemed as falling into the protected domain of the present subject matter.

In addition, it should be noted that the specific technical features described in above embodiments can be combined in any appropriate form, provided that there is no conflict. To avoid unnecessary repetition, the possible combinations are not described specifically in the present subject matter.

Moreover, different embodiments of the present subject matter can be combined freely as required, as long as the combinations don't deviate from the ideal and spirit of the present subject matter. However, such combinations shall also be deemed as falling into the scope disclosed in the present subject matter.

What is claimed is:

1. An amphiphilic reservoir protecting agent, consisting of structural units denoted by following formula (1), (2), (3) and (4):

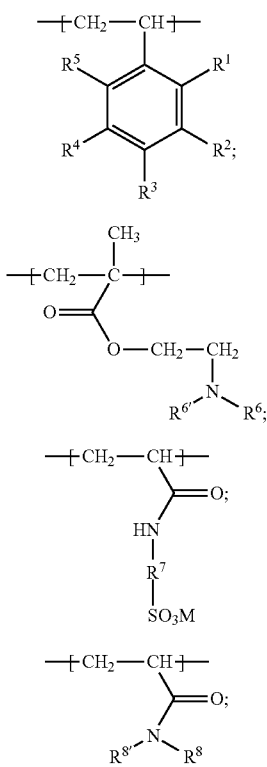

formula (1)

formula (2)

formula (3)

formula (4)

wherein $R^1$, $R^2$, $R^3$, $R^4$, and $R^5$ independently are H, $C_1$-$C_4$ alkyl or $C_1$-$C_4$ alkoxyl; $R^6$ and $R^{6'}$ independently are $C_1$-$C_3$ alkyl; $R^7$ is $C_1$-$C_6$ alkyl; M is H or an alkali metal; $R^8$ and $R^{8'}$ independently are $C_1$-$C_6$ alkyl, phenyl or $C_1$-$C_6$ alkyl substituted phenyl; wherein a molar ratio of the structural units denoted by formula (1):the structural units denoted by formula (2):the structural units denoted by formula (3):the structural units denoted by formula (4) is 1:0.4-2:0.5-1:0.1-0.5;

wherein a weight-average molecular weight of the amphiphilic reservoir protecting agent is 150,000-350,000 g/mol, wherein the amphiphilic reservoir protecting agent is a copolymer formed by initiating a polymerization reaction of a mixture of monomers of the structural units.

2. The amphiphilic reservoir protecting agent according to claim 1 wherein $R^1$, $R^2$, $R^3$, $R^4$, and $R^5$ independently are H, methyl, ethyl, methoxyl or ethyoxyl.

3. The amphiphilic reservoir protecting agent according to claim 2 wherein $R^6$ and $R^{6'}$ independently are methyl or ethyl.

4. The amphiphilic reservoir protecting agent according to claim 2 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$— or —$CH_2$—$CHCH_3$—$CH_2$—; M is H, Na, K or Li.

5. The amphiphilic reservoir protecting agent according to claim 3 wherein $R^7$ is —$CH_2$—$C(CH_3)_2$—$CH_2$—, —$C(CH_3)_2$—$CH_2$—, —$CH_2$—$C(CH3)_2$—, —$CH_2$—$C(CH_3)_2$—$CH_2$—$CH_2$—, —$CH_2$—$CH_2$—, —$CHCH_3$—$CH_2$— or —$CH_2$—$CHCH_3$—$CH_2$—; M is H, Na, K or Li.

6. The amphiphilic reservoir protecting agent according to claim 2 wherein $R^8$ and $R^{8'}$ independently are methyl, ethyl, n-propyl, n-butyl, iso-butyl, n-hexyl, phenyl, p-methylphenyl, or p-ethylphenyl.

7. The amphiphilic reservoir protecting agent according to claim 3 wherein $R^8$ and $R^{8'}$ independently are methyl, ethyl, n-propyl, n-butyl, iso-butyl, n-hexyl, phenyl, p-methylphenyl, or p-ethylphenyl.

8. The amphiphilic reservoir protecting agent according to claim 5 wherein $R^8$ and $R^{8'}$ independently are methyl, ethyl, n-propyl, n-butyl, iso-butyl, n-hexyl, phenyl, p-methylphenyl, or p-ethylphenyl.

9. The amphiphilic reservoir protecting agent according to claim 1 wherein a weight-average molecular weight of the amphiphilic reservoir protecting agent is 190,000-280,000 g/mol.

10. The amphiphilic reservoir protecting agent according to claim 9 wherein a molecular weight distribution coefficient of the amphiphilic reservoir protecting agent is 1-3.5.

11. The amphiphilic reservoir protecting agent according to claim 1 wherein the molar ratio of the structural units denoted by formula (1):the structural units denoted by formula (2):the structural units denoted by formula (3):the structural units denoted by formula (4) is 1:0.5-1.5:0.5-1:0.1-0.4.

* * * * *